(No Model.) 2 Sheets—Sheet 1.
T. B. DIXON.
TRACK INSTRUMENT.
No. 571,472. Patented Nov. 17, 1896.
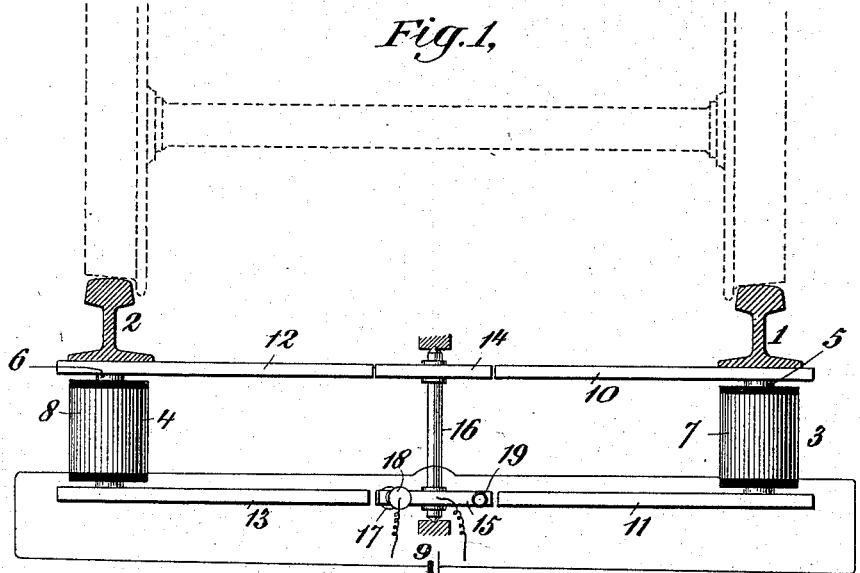
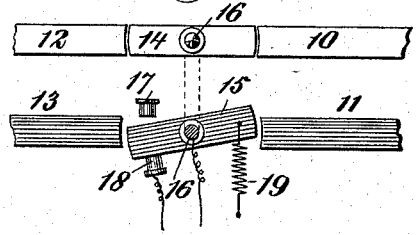
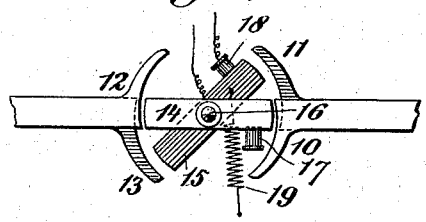
WITNESSES:
INVENTOR
Thomas B. Dixon
BY
ATTORNEYS

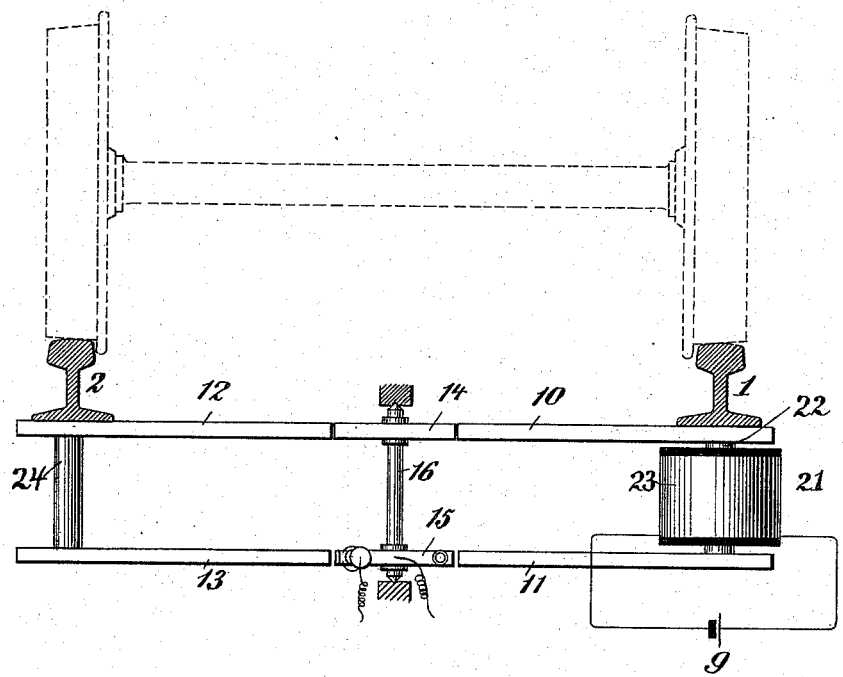

UNITED STATES PATENT OFFICE.

THOMAS BULLITT DIXON, OF HENDERSON, KENTUCKY.

TRACK INSTRUMENT.

SPECIFICATION forming part of Letters Patent No. 571,472, dated November 17, 1896.

Application filed November 15, 1895. Renewed October 14, 1896. Serial No. 608,891. (No model.)

*To all whom it may concern:*

Be it known that I, THOMAS BULLITT DIXON, a citizen of the United States, residing at Henderson, in the county of Henderson and State of Kentucky, have invented certain new and useful Improvements in Track Instruments; and I do hereby declare the following to be a full, clear, and exact description of the invention, such as will enable others skilled in the art to which it appertains to make and use the same.

My invention relates to track instruments for operating signal-controlling circuits or instruments or other similar devices, and particularly to magnetic track instruments.

My track instrument is an improvement upon the magnetic track instrument shown and described in an application for Letters Patent filed by me on September 12, 1895, Serial No. 562,263, means being provided for counteracting the effect of residual magnetism in the magnetic conductors, which weakens the action of my former track instrument somewhat.

My invention consists in the novel means provided for counteracting the effect of residual magnetism in the magnetic conductors and in the novel combination, construction, and arrangement of the parts constituting my track instrument.

The objects of my invention are, first, to provide a track instrument arranged to be operated by the variations of a magnetic field produced by car-wheels passing over the railway-track, and which shall be extremely sensitive and powerful in its action; second, to so construct this track instrument that the effect of residual magnetism in the conductors may be counteracted, and, third, to make the track instrument simple, strong, not liable to derangement, certain in action, and as inexpensive as possible.

These objects are attained in the track instrument herein described, and illustrated in the drawings which accompany and form a part of this application, in which the same reference-numerals indicate the same or corresponding parts, and in which—

Figure 1 shows my track instrument in place upon a track, the rails being sectioned transversely. Fig. 2 is a diagrammatic plan view of the pivoted armatures and the extremities of the pole-pieces, the upper armature and pole-pieces being moved to one side of their normal position in order to expose to view the lower armature and pole-pieces, and the shaft connecting the two armatures being indicated by a dotted line. Fig. 3 is a plan view of the armatures and pole-pieces in operative position, showing likewise a modification of the construction of the pole-pieces, in which they are provided with polar extensions extending through the arc of swing of the armatures, the object of which is to increase the arc of swing of the armatures and to produce a turning moment upon the armatures which shall be nearly uniform throughout the entire arc of swing; and Fig. 4 is a view similar to Fig. 1, illustrating a modified form of track instrument in which a single club-foot magnet is substituted for the two independent magnets of Fig. 1.

In the drawings, 1 and 2 are the track-rails, which may be supported upon ties of wood in the ordinary and common manner. Beneath the rails in the track instrument (shown in Fig. 1) are electromagnets 3 and 4, having cores 5 and 6 connected to the rails and helices 7 and 8 surrounding the cores, these helices being wound so that the correspondingly-located poles of the two magnets are of opposite polarity. Magnets 3 and 4 are independent, but may be energized by the current from a common battery 9. To the ends of the core of each magnet are connected magnetic conductors 10 and 11 for magnet 3 and 12 and 13 for magnet 4. The conductors of each magnet extend toward the conductors of the other magnet, but do not meet the same. As thus constructed there is a magnetic field between conductors 10 and 12, a second magnetic field between conductors 11 and 13, and a third magnetic field between the rails 1 and 2, the last-named field being in the line of motion of the train. Within the first-mentioned fields are placed armatures 14 and 15, supported by and keyed to a pivotal shaft 16, which has suitable bearings. This shaft may be vertical or horizontal, as desired, the ends of each pair of conductors being always arranged to be in the plane of the armature belonging to that pair of conductors. As shown in the drawings, the shaft 16 and the armatures 14 and 15 are placed between rails. This position is optional, however, for, if desired, the pivoted armatures may be at one side of the rails and at some distance therefrom, and the conductors 10, 11, 12, and 13 may be led to one side of the track, and instead of being composed of rigid bars they may, if desired, be flexible magnetic conductors, as described in my former above-mentioned application.

The armatures 14 and 15 are keyed to the shaft 16 in an angular position with respect to each other, so as to occupy different relative positions with respect to their respective magnetic fields, and the poles of conductors 10 and 12 are in closer proximity to the paths of motion of the ends of armature 14 than the poles of conductors 11 and 13 are to the paths of motion of the ends of armature 15, so that the attractive force exerted by conductors 10 and 12 upon the armature 14 is greater than the attractive force exerted by conductors 11 and 13 upon armature 15, and normally, therefore, armature 14 is held substantially in line with conductors 10 and 12, while armature 15 occupies an angular position with respect to conductors 11 and 13. As hereinafter explained, however, when car-wheels are on the rails the resistance of the magnetic circuit is greatly reduced, owing to the fact that the car-wheels and car-axles afford a magnetic conductor of large cross-section, thus greatly increasing the total strength of the field between the poles of conductors 11 and 13, while the field between the poles of conductors 10 and 12 is weakened relatively to the field between conductors 11 and 13, owing to the diversion of a large proportion of the lines of force through the car wheels and axles. Car-wheels upon the rails 1 and 2, therefore, while greatly increasing the strength of the poles of conductors 11 and 13, because of the decrease in the resistance of the magnetic circuit, decrease the strength of the poles of conductors 10 and 12 relatively to the strength of the poles of conductors 11 and 13, and this change in strength of the poles is sufficient to move the armature 15 into line with the conductors 11 and 13 and to move the armature 14 out of line with conductors 10 and 12. When the car-wheels leave the rails 1 and 2, however, the magnets 3 and 4 are restored to their normal strength and armatures 14 and 15 swing back into normal position.

The purpose of using the two armatures 14 and 15 may now be seen. Residual magnetism in conductors 10, 11, 12, and 13 tends to decrease the amount of variation of magnetic strength in the conductors caused by car-wheels on rails 1 and 2, and under ordinary circumstances all of the conductors will be equally subject to the effect of residual magnetism; but the increase in strength of magnets 3 and 4, which results when conductors having as great a cross-section as the car-wheels and axles of a train are connecting the poles at one end of the magnets, thus practically converting magnets 3 and 4 into a single horseshoe magnet, causes so great an increase in the magnetic strength of the poles of conductors 11 and 13 as to greatly overbalance the effect of the residual magnetism in the conductors and to produce a very strong action of the track instrument.

Suitable stops 17 and 18 for the armatures may be provided and one or both of these stops may be electrical contact-points, the armature which makes contact with said stops carrying contact-points arranged to make contact with the stops 17 and 18, or the armatures 14 and 15 may operate some other device for controlling railway-signals, as the controlling-valve of a hydraulic or pneumatic signal system.

The operation of my track instrument is as follows: The parts being in the position shown in Fig. 3, which is the normal position, when car-wheels pass upon rails 1 and 2 the resistance of the magnetic circuit is greatly decreased, thus increasing greatly the strength of the magnet and the strength of the field between the poles of conductors 11 and 13 and increasing the turning moment on armature 15, but weakening the field between conductors 10 and 12 with respect to the field between conductors 11 and 13, owing to the diversion of the lines of force through the car-wheels and axles, and therefore weakening the turning moment acting on armature 14. Armature 15 is therefore moved into line with its magnetic conductors 11 and 13, while armature 14 is moved out of line with its magnetic conductors. This movement of the armatures causes the operation of contact-points or other similar signal-controlling devices connected with the armatures. When the car-wheels move off from rails 1 and 2 the magnetic fields are restored to their normal condition, armature 14 moves into line with its conductors 10 and 12, and armature 15 moves out of line with its conductors 11 and 13, again operating the contact-points or signal-controlling devices.

As will be seen from the above description no spring or other retractile device acting upon the armatures 14 and 15 is necessary to move them when the magnetic field is varied by the passage of a train. If it is desired, however, to make the action of the track instrument yet more positive, a spring, as 19, may be used.

In the construction shown in Fig. 3 the poles of the magnetic conductors are provided with polar extensions or horns extending through the arc of swing of their respective armatures. This construction greatly increases the angle through which the armatures swing, and also produces a turning moment which is nearly uniform throughout the arc of swing. I have found that the best effects are obtained by using pole-pieces which are not circular but are elliptical, or, what is substantially the same thing, using pole-pieces which are circular, but are placed eccentrically with respect to the armatures, and which are so placed that when each armature is in an angular position with respect to its magnetic conductors its ends are farther from the poles of those conductors than when it is in line with said conductors.

Where pole-pieces of this character are used, the poles of the magnetic field between the pole-pieces may be understood to be the points on the polar surface which would be opposite the ends of an armature swinging freely between the pole-pieces when in its normal position.

It is not necessary in my track instrument to use two separate magnets, as shown in Fig. 1. Instead a single magnet may be used. In Fig. 4 is illustrated a track instrument so constructed. 21 is the magnet, having a core 22, connected to one rail, and a magnetizing-helix 23. A bar 24, of soft iron, is secured to the other rail, corresponding, in fact, to the core of a second magnet, but having no helix thereon. To the bar 24 and core 22 are connected the magnetic conductors 10, 11, 12, and 13, and between these conductors are the armatures 14 and 15. The operation of this track instrument is the same as that of the track instrument shown in Fig. 1.

I do not limit myself to the use of electromagnets in my track instrument, but may use permanent magnets instead.

Having thus completely described my invention, what I claim, and desire to secure by Letters Patent, is—

1. In a track instrument, the combination, with a magnet, of two armatures connected together, movably mounted and located in magnetic fields of said magnet, said armatures occupying different relative positions with respect to the poles of their respective magnetic fields and the field of one of said armatures being arranged to be weakened with respect to the field of the other armature when a train passes over the track, and means for holding the first-named armature normally in closer proximity to the poles of its magnetic field than the other armature, whereby, when a train passes over the track, said armatures are caused to move, substantially as described.

2. In a track instrument, the combination, with a magnet, of two armatures connected together, movably mounted and located in magnetic fields of said magnet, said armatures occupying different relative positions with respect to the poles of their respective magnetic fields and the fields of one of said armatures being arranged to be weakened with respect to the field of the other armature when a train passes over the track, means for holding the first-named armature normally in closer proximity to the poles of its magnetic field than the other armature, whereby, when a train passes over the track, said armatures are caused to move, and a signal-controlling device operated by the movement of said armatures, substantially as described.

3. In a track instrument, the combination, with a magnet, of two armatures connected together, movably mounted, and located in magnetic fields of said magnet, said armatures occupying different angular positions with respect to the lines of force of their respective magnetic fields and the field of one armature being arranged to be weakened with respect to the field of the other armature when a train passes over the track, and means for holding the first-named armature normally in closer parallelism with the lines of force of its magnetic field than the other armature, whereby, when a train passes over the track, said armatures are caused to move, substantially as described.

4. In a track instrument, the combination, with a magnet, of two armatures connected together, movably mounted, and located in magnetic fields of said magnet, said armatures occupying different angular positions with respect to their respective magnetic fields, and the field of one armature being arranged to be weakened with respect to the field of the other armature when a train passes over the track and having its poles in closer proximity to the path of motion of the ends of its armature than are the poles of the other magnetic field with respect to the other armature, whereby the first-mentioned armature is caused normally to be in closer parallelism with the line of force of its magnetic field than is the second armature, and both armatures are caused to move when a train passes over the track, substantially as described.

5. In a track instrument, the combination, with a magnet, of two armatures secured to a common pivotally-mounted shaft, and located in magnetic fields of said magnet, said armatures occupying different angular positions with respect to the lines of force of their respective magnetic fields, and the field of one armature being arranged to be weakened with respect to the field of the other armature when a train passes over the track, and means for holding the first-named armature normally in closer parallelism with the lines of force of its magnetic field than the other armature, whereby, when a train passes over the track, said armatures are caused to move, substantially as described.

6. In a track instrument, the combination, with a magnet, of two armatures secured to a common pivotally-mounted shaft, and located in magnetic fields of said magnet, said armatures occupying different angular positions with respect to the lines of force of their respective magnetic fields and the field of one armature being arranged to be weakened with respect to the field of the other armature when a train passes over the track, means for holding the first-mentioned armature normally in closer parallelism with the lines of force of its magnetic field than the other armature, whereby, when a train passes over the track, said armatures are caused to move, and a signal-controlling device operated by the movement of said armatures, substantially as described.

7. In a track instrument, the combination, with two magnets, producing between their unlike poles magnetic fields, of two armatures connected together, movably mounted, and located in magnetic fields produced by said magnets, said armatures occupying different relative positions with respect to the poles of their respective magnetic fields, and the field of one of said armatures being arranged to be weakened with respect to the field of the other armature when a train passes over the track, and means for holding the first-named armature normally in closer proximity to the poles of its magnetic field than the other armature, whereby, when a train passes over the track, said armatures are caused to move, substantially as described.

8. In a track instrument, the combination, with two magnets having connected to their poles magnetic conductors, the conductors of the unlike poles of said magnets extending toward each other and having at their ends magnetic poles producing between them magnetic fields, of two armatures connected together, movably mounted, and located in magnetic fields produced between said magnetic conductors, said armatures occupying different relative positions with respect to the poles of their respective magnetic conductors, and the field of one of said armatures being arranged to be weakened with respect to the field of the other armature when a train passes over the track, and means for holding the first-named armature normally in closer proximity to the poles of its magnetic field than the other armature, whereby, when a train passes over the track, said armatures are caused to move, substantially as described.

9. In a track instrument, the combination, with two magnets having unlike poles connected to the track-rails, and magnetic conductors connected with said magnet-poles and producing between them a magnetic field arranged to be short-circuited by wheels passing over the track, of other magnetic conductors connected with the other poles of said magnets and likewise producing between them a magnetic field, and two armatures connected together, movably mounted, and located in said magnetic fields respectively, said armatures occupying different positions with respect to the poles of their respective magnetic conductors, whereby, when a train passes over the track, said armatures are caused to move, substantially as described.

In testimony whereof I affix my signature in presence of two witnesses.

THOMAS BULLITT DIXON.

Witnesses:
H. A. CASE,
H. M. MARBLE.